3,012,974
PREPARATION OF SODIUM DISPERSIONS
Robert E. Robinson, Cincinnati, and Karl Koch, Norwood, Ohio, assignors to National Distillers and Chemical Corporation, New York, N.Y., a corporation of Virginia
No Drawing. Filed Mar. 14, 1958, Ser. No. 721,366
6 Claims. (Cl. 252—314)

The present invention relates to a method for preparation of finely divided sodium dispersions in substantially reproducible manner with respect to particle size and superior activity characteristics.

In the use of sodium for carrying out chemical reactions, the sodium may be used in any of various forms, such as, for example, brick sodium, sodium sand and dispersions of finely divided sodium in an inert liquid. With respect to the latter, there is usually incorporated an emulsifying agent, generally of the detergent type, to aid in stabilization of the finely divided sodium dispersion. In such usage for sodium dispersions, it is highly desirable that they be preparable in substantially reproducible manner with respect to particle size and high activity characteristics so that, when used in a specific chemical reaction, the sodium will react in substantially uniform and consistent manner with respect to rate of reaction, completion of reaction, sodium utilization, etc. and will not entail substantial changes in equipment for handling the dispersions.

Generally speaking, sodium dispersions of similar particle size characteristics and prepared by the same or similar method have been assumed to possess similar activity characteristics and, in some instances, and particularly with relatively coarse dispersions, such results are actually obtained. However, in the preparation of dispersions of extremely finely divided sodium, extensive investigation has revealed that, although the dispersions may be of the same or similar particles size characteristics, they do not often if at all exhibit the same activity. Moreover, it has not been possible to predict, from knowledge of particle size characteristics, what activity characteristics will be possessed by extremely finely divided sodium dispersions, even by comparison with another dispersion of similar particle size. For instance, it has been found that with coarse dispersions over a wide range of particle size characteristics, the activity of a sodium dispersion is reasonably consistent (though of relatively low order). However, with dispersions of extremely finely divided particles, such as dispersions devoid of a substantial amount of particles over five microns in size, the activity is not predictable nor consistently reproducible among several dispersions of substantially the same particle size characteristics.

In order to illustrate such behavior of sodium dispersions, data are set forth hereinafter (Table I) showing the activity characteristics of several dispersions of extremely finely divided sodium. For such dispersions the activity characteristics were determined by the following procedure and the particle sizes determined by visual examination with a microscope.

A 2–3 g. sample of the sodium dispersion is weighed into a small dry round-bottomed flask, taking care to exclude atmospheric oxygen during the operation. The flask is attached to a system containing a pressure equalized dropping funnel and a gas burette. The dispersion is diluted with 30 ml. of mineral spirits, then treated with 1.5 ml. of titanium tetrachloride in 10 ml. of mineral spirits. The titanium tetrachloride is added over a five minute period from the dropping funnel. The mixture is stirred (magnetically) for several minutes, is then treated with 20 ml. of ethylene glycol monomethyl ether, and the volume of hydrogen evolved is measured. The hydrogen evolved is a measure of the sodium which did not react with titanium tetrachloride.

The procedure is repeated, except that the treatment with titanium tetrachloride is omitted, and the hydrogen generated in this case is a measure of the total sodium in the sample.

The activity, expressed as a percent, is calculated as follows:

$$\text{Percent activity} = \left(1 - \frac{P_2 V_2 M_1 T_1}{P_1 V_1 M_2 T_2}\right) \times 100$$

where $P$ = atmospheric pressure.
$V$ = volume of hydrogen.
$M$ = weight of sample.
$T$ = absolute temperature.

The subscript (1) refers to the untreated specimen, and (2) to the titanium tetrachloride treated specimen.

TABLE I

Sodium Dispersion—Ingredients:
500 g. sodium.
1,500 g. mineral spirits.
10 g. aluminum stearate.

| Run No. | Dispersion | | Percent activity |
|---|---|---|---|
| | Maximum particle size (microns) | Average particle size (microns) | |
| 1 | 3 | 1 | 80 |
| 2 | 3 | 2 | 62 |
| 3 | 2 | 1 | 59 |
| 4 | 4 | 2.5 | 18 |
| 5 | 5 | 3.5 | 7 |
| 6 | 4 | 3 | 64 |
| 7 | 3 | 2 | 52 |
| 8 | 4 | 3 | 63 |

As is apparent from the foregoing data and even though the dispersions were of extremely fine particle size with respect to maximum size of the particles and average particle size, the activity varied considerably and, with the exception of Run 1, was of low order.

In accordance with this invention, it has been found that sodium dispersions of extremely fine particle size characteristics, such as on the order of most of the dispersions for which the aforesaid data are set forth, can be prepared in substantially reproducible manner with respect to high activity characteristics if the preparation of the dispersions are carried out in the presence of a small amount of water based on the weight of sodium. Accordingly, the present invention resides in the preparation of fine dispersions of sodium in a suitable inert liquid in the presence of a suitable emulsifying agent and a small amount of water as, for example, from 0.1 to 1.5% based on the weight of sodium and, more preferably, from about 0.4 to 0.8% based on the amount of sodium.

For use as the inert liquid carrier medium for the sodium, any of a wide variety of materials that are not reactive with the sodium may be used and, generally, which have a boiling point above the melting point of sodium. However, also contemplated are liquids that boil below the melting point of sodium thereby necessitating use of elevated pressures during their preparation. Thus, there may be used inert hydrocarbons, ethers, tertiary amines, etc. and other organic substances stable against cleavage by sodium. Examples of such liquids include certain ethers such as methyl ether, tetrahydrofuran, dimethyl ether of ethylene glycol, and dibutyl ether and hydrocarbons such as petroleum ether, pentane, cyclopentane, the hexanes, heptanes, octanes, mineral spirits, benzene, the xylenes, toluene, straight run kerosenes, etc. Particularly suitable are the inert hydrocarbons, including aliphatic and aromatic hydrocarbons and, as the ethers, aliphatic monoethers in which the ratio of the number of oxygen atoms to the number of carbon atoms is not less than 1:4 and preferably containing a methoxy group, and acyclic and cyclic polyethers derived by replacing all of the hydroxyl hydrogen atoms of the appropriate polyhydric alcohol by alkyl groups. As tertiary amines, there may be used N-methylmorpholine, dimethylaniline, etc.

The emulsifying agent may also be selected from any of a wide variety of agents, mainly of the detergent type, and many of which are known to those skilled in the art for stabilization of sodium dispersions. Such agents include metal salts of organic acids, both of the aliphatic and aromatic acids, and particularly such salts of long chain fatty acids. Examples, thereof include salts such as aluminum stearate, copper oleate, aluminum octanoate, calcium stearate, aluminum laurate, lead naphthenate, and zinc stearate, as well as other types such as dimerized linoleic acid.

For practice of this invention, the dispersions may suitably be prepared by use of a colloid mill blanketed with an inert gas such as argon. The mill is fed from a hopper from which materials are drawn into the chamber of the mill. The chamber is charged with the desired amount of the inert carrier liquid in which there is dissolved the emulsification agent with the contents of the hopper being at a temperature of about 50° to 120° C. The sodium, usually in small pieces, is added to the hopper with the mill in operation and the mill is operated for a period of time sufficient to reduce the sodium in size and provide the particle size characteristics for practice of this invention. The small amount of water, required for practice of this invention is preferably added to the feed hopper prior to addition of the sodium. In preferred embodiment, this invention is carried out by adding the sodium in substantially anhydrous form in the carrier liquid but alternatively, the invention may be carried out with sodium which is wet with the required amount of water (measured by gain in weight) such as may be provided by exposure of the sodium to the atmosphere prior to its use for preparation of the finely divided dispersion.

In order to illustrate the improvement obtained by practice of this invention, there is set forth in the following tabulation results obtained from several dispersions prepared in accordance with this invention wherein water and an emulsifying agent were present during preparation of the dispersion by the aforesaid method using 500 grams of sodium, 1500 grams of mineral spirits, and the amount of water, and emulsifying agent shown for each example.

TABLE II

| Run No. | Percent water based on amount of sodium | Emulsifying agent | Percent based on sodium | Dispersion | | Activity |
| | | | | Maximum particle size | Average particle size | |
| --- | --- | --- | --- | --- | --- | --- |
| 1 | 0.4 | Aluminum stearate | 2 | 1 | <1 | 96 |
| 2 | 0.8 | ----do---- | 2 | 1 | <1 | 94 |
| 3 | 0.2 | ----do---- | 2 | 2 | 1 | 91 |
| 4 | 0.4 | Copper oleate | 2 | 4 | 2 | 94 |

Since, as shown in Table I, the highest activity of a comparable dispersion (Run No. 1) was 80, it is apparent from the data in Table II that preparation of the dispersions in the presence of water as embodied herein resulted not only in dispersions of much higher activity but with substantial consistency from batch to batch. In further runs utilizing N-octane as the inert dispersion medium, dispersions were prepared using 420 g. of sodium, 1250 g. of normal octane, 10 g. of aluminum stearate and 2 ml. (0.5% on sodium) of water. The resulting dispersion had a maximum particle size of 1 micron and an activity of 91%.

As aforesaid, the improvements from this invention are obtained with sodium dispersions of substantially finely divided sodium, such as, for example, sodium dispersions that average less than about 5 microns and, more specifically, not only average less than about 5 microns but are substantially devoid of particles larger than 5 microns. Whereas, as is apparent from the foregoing, the presence of water during preparation of dispersions of substantially finely divided sodium resulted in a marked increase in activity characteristics with substantially reproducible results, such results have been found not to occur in preparation of dispersions of coarser sodium particles than are embodied herein. For example, a dispersion (maximum particle size of 40 microns and an average particle size of 17 microns) was prepared from a composition of 25% by weight of sodium in mineral spirits and 2% (based on sodium) of aluminum stearate. Such a dispersion showed a zero activity in the aforedefined test. By use of the same composition but to which 0.4% (based on sodium) of water was added, there was provided a dispersion of similar particle size characteristics (35 micron maximum and 15 micron average) and which also had zero activity, thereby illustrating that the use of water in preparation of such a coarse dispersion had no substantial, if any, effect on the activity of such coarse dispersion.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for preparation of dispersions of sodium particles in an inert organic liquid medium by sub-dividing sodium metal in the presence of said liquid medium and in the presence of a dispersing agent consisting essentially of a water-insoluble metal salt of a long-chain fatty acid to provide such dispersions in which the sodium particles average less than about five microns in size, the improvement which comprises preparing said sodium dispersions in the presence of from about 0.1 to about 1.5 percent of water based on the weight of the sodium metal.

2. The process of claim 1, wherein water is present in an amount of from about 0.4 to about 0.8% based on the weight of sodium.

3. The process of claim 1, wherein the sodium metal is sub-divided to provide a dispersion in which the sodium particles average less than five microns and the dispersion is substantially devoid of particles larger than five microns.

4. The process of claim 1, wherein the inert liquid medium has a boiling point higher than the melting point of sodium and is an organic compound from the group consisting of liquid hydrocarbons and liquid ethers that are substantially inert to sodium.

5. The process of claim 1, wherein the dispersing agent is aluminum stearate.

6. In a process for preparation of dispersions of sodium particles in an inert liquid hydrocarbon by sub-dividing sodium metal in presence of said liquid hydrocarbon and aluminum stearate as a dispersing agent to provide sodium dispersions in which the sodium particles average less than five microns in size and are substantially devoid of particles larger than about five microns, the improvement which comprises preparing said sodium dispersions in the presence of from about 0.4 to about 0.8% by weight of water based on the weight of sodium metal.

References Cited in the file of this patent
UNITED STATES PATENTS

| | | |
|---|---|---|
| 2,394,608 | Hansley | Feb. 12, 1946 |
| 2,635,041 | Hansley | Apr. 14, 1953 |
| 2,798,797 | Shepherd | July 9, 1957 |
| 2,852,353 | Craig et al. | Sept. 16, 1958 |